(12) United States Patent
Matsuda et al.

(10) Patent No.: US 9,979,130 B2
(45) Date of Patent: May 22, 2018

(54) CHARGING INLET

(71) Applicants: SUMITOMO WIRING SYSTEMS, LTD., Yokkaichi-shi, Mie (JP); TOYOTA JIDOSHA KABUSHIKI KAISHA, Toyota-shi, Aichi (JP)

(72) Inventors: Toshiyuki Matsuda, Yokkaichi (JP); Kenya Takahashi, Yokkaichi (JP); Daisuke Ito, Yokkaichi (JP); Eiji Kitano, Toyota (JP)

(73) Assignees: SUMITOMO WIRING SYSTEMS, LTD., Yokkaichi, Mie (JP); TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 0 days. days.

(21) Appl. No.: 15/533,436

(22) PCT Filed: Nov. 27, 2015

(86) PCT No.: PCT/JP2015/083330
§ 371 (c)(1),
(2) Date: Jun. 6, 2017

(87) PCT Pub. No.: WO2016/098558
PCT Pub. Date: Jun. 23, 2016

(65) Prior Publication Data
US 2017/0338594 A1    Nov. 23, 2017

(30) Foreign Application Priority Data
Dec. 18, 2014 (JP) ................. 2014-256492

(51) Int. Cl.
*H01R 13/625* (2006.01)
*H01R 13/639* (2006.01)

(52) U.S. Cl.
CPC .................. *H01R 13/639* (2013.01)

(58) Field of Classification Search
CPC .............. H01R 13/639; H01R 13/6397; H01R 13/6395; H01R 13/62; H01R 13/627; H01R 13/6275
(Continued)

(56) References Cited

U.S. PATENT DOCUMENTS 1,345,212 A * 6/1920 Monahan ................. F21L 4/00
    362/21
2,825,782 A * 3/1958 Rhodes ................. H01H 51/06
    200/302.1
(Continued)

FOREIGN PATENT DOCUMENTS

JP    2012-64505    3/2012
JP    2012-199024    10/2012
(Continued)

OTHER PUBLICATIONS

International Search Report dated Jan. 12, 2016.

*Primary Examiner* — Abdullah Riyami
*Assistant Examiner* — Vladimir Imas
(74) *Attorney, Agent, or Firm* — Gerald E. Hespos; Michael J. Porco; Matthew T. Hespos (57) ABSTRACT

A charging inlet 10 described in this specification includes a cable lock mount portion 30 for mounting a cable lock 50. The cable lock mount portion 30 includes: locking walls 31 including locking holes 31A, 31B for insertion of a cable lock pin 40; a pin lock 35 to be locked on the cable lock pin 40 for retaining the cable lock pin 40; and a displacement restricting portion (support walls 36) for restricting displacement of the cable lock pin when the cable lock pin 40 is displaced in a direction toward the pin lock 35. The displacement restricting portion restricts the displacement of (Continued)

the cable lock pin 40 by abutting on the cable lock pin 40 in a position at which the cable lock pin 40 does not contact the pin lock 35.

7 Claims, 9 Drawing Sheets

(58) Field of Classification Search
USPC .......................................... 439/345, 352, 142
See application file for complete search history.

(56) References Cited

U.S. PATENT DOCUMENTS

| | | | | | |
|---|---|---|---|---|---|
| 4,685,709 | A | * | 8/1987 | Kambic | E05B 47/0012 292/201 |
| 5,751,135 | A | * | 5/1998 | Fukushima | B60L 11/1818 320/107 |
| 5,934,919 | A | * | 8/1999 | Cross | H01R 13/6395 439/136 |
| 5,982,611 | A | * | 11/1999 | Campbell | H02B 1/21 174/541 |
| 7,008,256 | B2 | * | 3/2006 | Poiraud | H01R 4/5033 439/394 |
| 7,056,138 | B2 | * | 6/2006 | Lewis | H01R 13/518 174/135 |
| 7,452,218 | B2 | * | 11/2008 | Sasser | G02B 6/4246 439/92 |
| 7,596,860 | B2 | * | 10/2009 | Sutter | H01R 9/05 29/751 |
| 7,797,827 | B2 | * | 9/2010 | Sutter | H01R 9/05 29/747 |
| 7,862,353 | B1 | * | 1/2011 | Azad | H01R 13/62938 439/157 |
| 8,251,734 | B2 | * | 8/2012 | Katagiri | B60L 11/14 439/352 |
| 8,256,102 | B2 | * | 9/2012 | Sutter | H01R 9/05 29/751 |
| 8,287,297 | B2 | * | 10/2012 | Schmidt | H01R 24/64 439/345 |
| 8,342,856 | B2 | * | 1/2013 | Takada | H01R 13/521 439/246 |
| 8,357,016 | B2 | * | 1/2013 | Schumacher | H01R 13/4368 439/814 |
| 8,360,796 | B2 | * | 1/2013 | Daubigney | H01R 13/6275 439/345 |
| 8,573,994 | B2 | * | 11/2013 | Kiko | B60L 3/0069 320/109 |
| 8,573,997 | B2 | * | 11/2013 | Neer | H01R 9/038 439/345 |
| 8,602,804 | B2 | | 12/2013 | Kurumizawa et al. | |
| 8,647,135 | B2 | | 2/2014 | Kurumizawa et al. | |
| 8,870,582 | B2 | * | 10/2014 | Yamamaru | B60L 11/1818 439/135 |
| 8,884,773 | B2 | * | 11/2014 | Wiesemann | B60L 3/0069 320/109 |
| 8,932,072 | B2 | * | 1/2015 | Tamaki | H01R 13/6272 439/345 |
| 8,933,332 | B2 | * | 1/2015 | Yamamaru | B60L 11/1818 174/67 |
| 9,039,437 | B2 | * | 5/2015 | Kurumizawa | H01R 13/6397 439/352 |
| 9,088,087 | B2 | * | 7/2015 | Wardenburg | H01R 13/44 |
| 9,088,104 | B2 | * | 7/2015 | Kahara | H01R 13/6397 |
| 9,199,551 | B2 | * | 12/2015 | Kahara | B60L 1/003 |
| 9,281,618 | B2 | * | 3/2016 | Kurumizawa | H01R 13/639 |
| 9,446,673 | B2 | * | 9/2016 | Nakajima | B60L 11/1818 |
| 9,463,702 | B2 | * | 10/2016 | Fukushima | H01R 13/506 |
| 9,509,095 | B2 | * | 11/2016 | Ohmura | H01R 13/639 |
| 9,533,586 | B2 | * | 1/2017 | Kahara | B60L 11/1818 |
| 9,620,897 | B2 | * | 4/2017 | Takagi | H01R 13/62933 |
| 2011/0212645 | A1 | * | 9/2011 | Osawa | H01R 13/502 439/352 |
| 2011/0223792 | A1 | * | 9/2011 | Osawa | B60L 11/1818 439/345 |
| 2012/0108097 | A1 | * | 5/2012 | Takagi | H01R 13/6275 439/345 |
| 2012/0156896 | A1 | * | 6/2012 | Corless | H01R 13/447 439/35 |
| 2012/0238122 | A1 | * | 9/2012 | Hirashita | B60L 11/1818 439/304 |
| 2013/0078840 | A1 | * | 3/2013 | Inoue | B60L 11/1818 439/345 |
| 2013/0255333 | A1 | * | 10/2013 | Kurumizawa | E05B 83/28 70/237 |
| 2013/0260595 | A1 | * | 10/2013 | Tamaki | H01R 13/6272 439/345 |
| 2014/0045360 | A1 | * | 2/2014 | Toratani | H01R 13/639 439/345 |
| 2014/0111144 | A1 | * | 4/2014 | Mo | H01R 13/6392 320/107 |
| 2014/0167696 | A1 | * | 6/2014 | Kahara | B60L 11/1818 320/109 |
| 2014/0184158 | A1 | * | 7/2014 | Osawa | H01R 13/639 320/109 |
| 2014/0285148 | A1 | * | 9/2014 | Osawa | H01R 13/639 320/109 |
| 2014/0292276 | A1 | * | 10/2014 | Osawa | H01R 13/639 320/109 |
| 2016/0013587 | A1 | * | 1/2016 | Shimizu | H01R 13/5227 439/153 |

FOREIGN PATENT DOCUMENTS

| | | |
|---|---|---|
| JP | 2013-175408 | 9/2013 |
| JP | 2013-206828 | 10/2013 |

* cited by examiner

CHARGING INLET

BACKGROUND

1. Field of the Invention

The technology disclosed in the present description relates to a charging inlet.

2. Description of the Related Art

A conventional example of a power reception device mounted on an electric automobile, a hybrid vehicle, and the like is disclosed in Japanese Patent Application Laid-Open No. 2013-175408. The power reception device is a device into which a power feeding plug on the charge facility side is inserted when a battery is charged, and which is provided with a box attached to the vehicle body, a body attached to the box, and an inlet assembled to the body. The power feeding plug is configured to be inserted into a cylindrical portion of the body, and the body is integrally provided with a cable lock for preventing the power feeding plug inserted into the cylindrical portion from coming off the cylindrical portion. On the cable lock, a lock lever is pivotally journaled. When charging is started, an actuator is driven and the lock lever is fixed in a lock position, whereby the pulling of the power feeding plug is prevented.

However, in the above power feeding device, a dedicated tool is required to attach the actuator to the cable lock, and the attachment operation becomes cumbersome. Accordingly, there is a method that has been devised to facilitate the actuator attachment operation. In this method, the cable lock is separated from the body, the actuator is assembled into the cable lock in advance, and the cable lock is simply attached to the body later using a cable lock pin. In this way, the cable lock pin may be simply inserted into the body, and no dedicated tool is required.

The cable lock pin includes, for example, a pair of opposed lock pins linked by a link portion in a substantially U-shape. The body includes a cable lock mount portion to which the cable lock is attached. The cable lock mount portion is provided with a pair of locking holes into which the pair of lock pins are inserted, and a pin lock which is locked on the link portion to retain the cable lock pin. The pin lock is configured in a cantilever fashion, and adapted for pivotal motion in a direction perpendicular to a lock pin insertion direction.

However, in the method using the cable lock pin, when the vehicle vibrates, the vibrations are transmitted to the cable lock mount portion to cause the cable lock pin to vibrate in a direction perpendicular to the lock pin insertion direction, and the cable lock pin contacts the pin lock, causing the pin lock to also vibrate. In a worst case, the pin lock may become damaged and the cable lock pin may detach from the cable lock mount portion.

SUMMARY

A charging inlet disclosed in the present description is a charging inlet which includes a cable lock mount portion for mounting a cable lock. The cable lock mount portion includes: a locking wall including a locking hole in which a cable lock pin is to be inserted; a pin lock to be locked on the cable lock pin for retaining the cable lock pin; and a displacement restricting portion which restricts displacement of the cable lock pin toward the pin lock by abutting on the cable lock pin at a position at which the cable lock pin does not contact the pin lock when the cable lock pin is displaced in a direction toward the pin lock.

In this configuration, displacement of the cable lock pin is restricted by the displacement restricting portion, so that the cable lock pin does not contact the pin lock. Accordingly, when the vehicle vibrates and the cable lock pin is vibrated, the vibrations of the cable lock pin are not directly transmitted to the pin lock. Thus, damage to the pin lock can be prevented, and further the cable lock pin and the cable lock can be prevented from coming off the cable lock mount portion.

The charging inlet disclosed in the present description may have the following configurations.

The cable lock pin may have a substantially U-shape as a whole, and may include a pair of opposed lock pins and a locked portion linking the lock pins. The lock pin may be inserted into the locking hole and the locked portion may be locked by the pin lock.

In this configuration, by inserting the pair of lock pins into respective locking holes, the posture of the locked portion can be stabilized, and the locked portion can be easily held in a state of being locked by the locking portion.

The pin lock may include an arm portion extending in cantilever fashion and being bendable, and a locking portion at a distal-end portion of the arm portion to be locked on the locked portion.

In this case, the shape of the pin lock may be set such that the locked portion does not contact the arm portion but is locked on the locking portion.

The displacement restricting portion may include a pair of support walls for supporting the locked portion with a gap ensured between opposed surfaces of the arm portion and the locked portion in a state in which the locked portion is supported on the support walls.

In this configuration, the locked portion can be supported by the pair of support walls, so that, when vibrations are transmitted to the cable lock pin, the locked portion can be prevented from contacting the arm portion.

The displacement restricting portion may be further provided with a link wall linking the pair of support walls, and the arm portion may bend to contact the link wall and then return to a height where at least the locking portion can be locked on the locked portion.

In this configuration, when external force is applied to the arm portion, and the arm portion is bent to contact the link wall and undergoes plastic deformation, the cable lock pin can be prevented from coming off because the link portion is provided such that the arm portion can return to a height enabling the locking portion to be locked on the locked portion.

According to the charging inlet disclosed in the present description, damage to the pin lock can be prevented, and further the cable lock pin and the cable lock can be prevented from coming off the cable lock mount portion.

DETAILED DESCRIPTION

Figure 1:
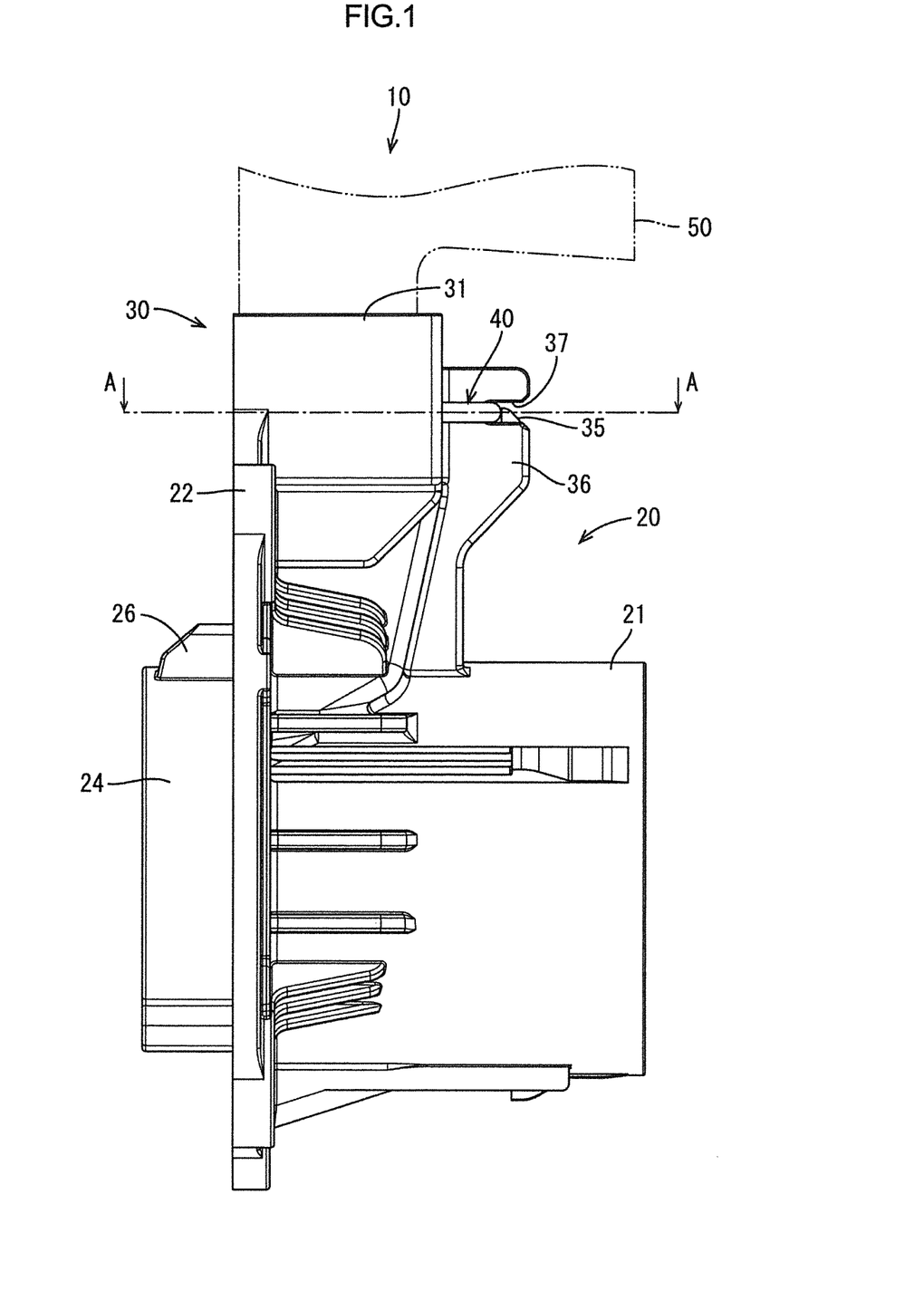
FIG. 1 is a side view of a charging inlet according to an embodiment.

An embodiment will be described with reference to FIG. 1 to FIG. 10. In the present embodiment, a charging inlet 10 is a connecting device mounted on an electric automobile, a hybrid vehicle, and the like. The charging inlet 10 is adapted for connection of a charge connector, which is not illustrated, from the front for charging a battery. As illustrated in FIG. 1, the charging inlet 10 is provided with a housing 20 including a cable lock mount portion 30 to which a cable lock 50 is mounted from above, and a cable lock pin 40 inserted into the cable lock mount portion 30 from the rear.

Figure 3:
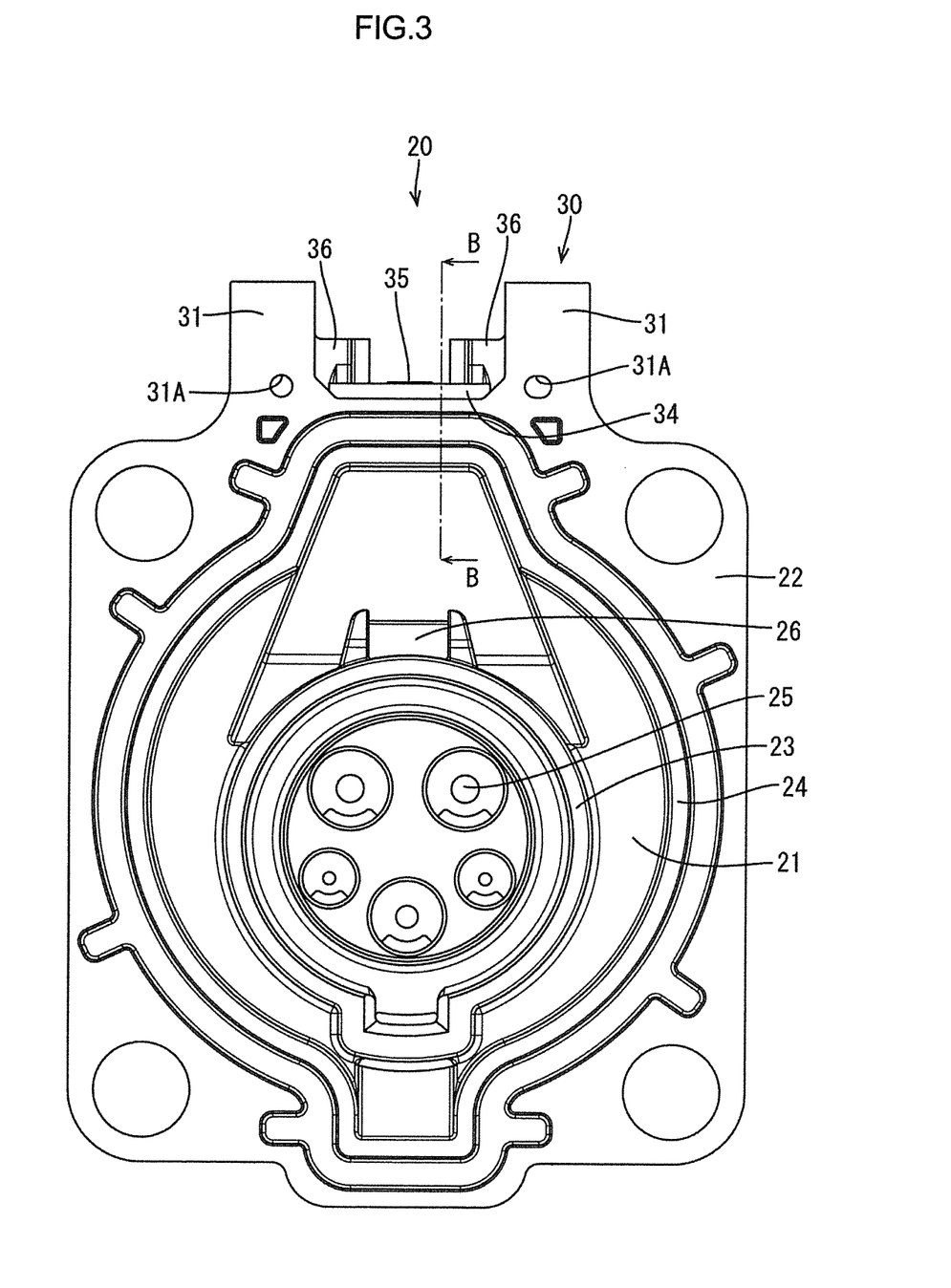
FIG. 3 is a front view of a housing.

The housing 20 is made of synthetic resin, and, as illustrated in FIG. 3, provided with a connector fitting portion into which the charge connector is fitted, and an attachment plate 22 extending from the outer peripheral surface of the connector fitting portion 21. The connector fitting portion 21 includes an inner cylinder portion 23 and an outer cylinder portion disposed around the inner cylinder portion 23. Between the inner cylinder portion 23 and the outer cylinder portion 24, a hood portion of the charge connector can be advanced. In the inner cylinder portion 23, a plurality of cavities 25 for housing a plurality of terminals are provided.

On an upper end portion of the inner cylinder portion 23, a fitting-locking portion 26 is disposed. The fitting-locking portion 26 is adapted for locking of a distal end portion of a lock lever (not illustrated) provided in the charge connector. The distal end portion of the lock lever is locked on the fitting-locking portion 26, and thus the charge connector is held in a state of being fitted in the connector fitting portion 21.

Figure 5:
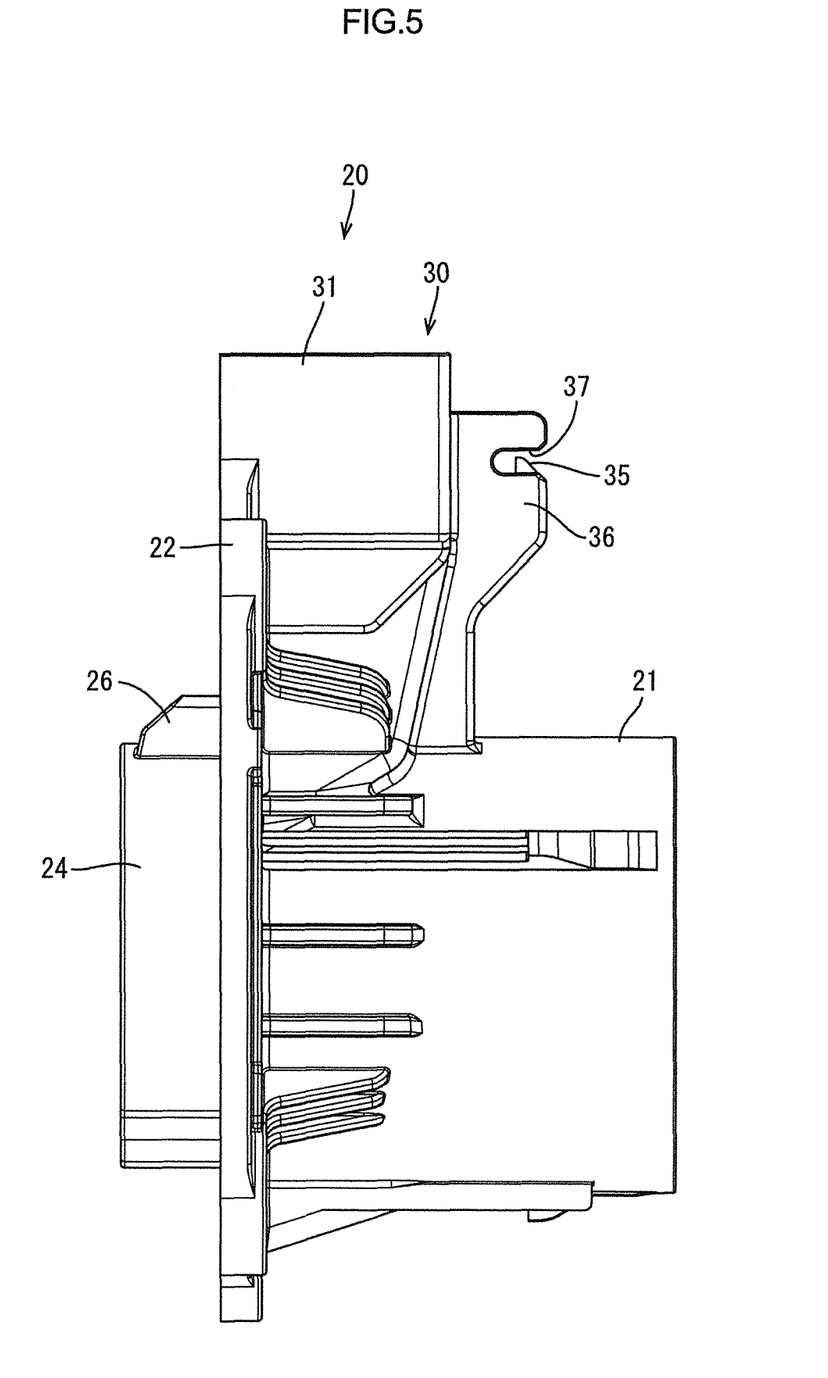
FIG. 5 is a side view of the housing.
Figure 6:
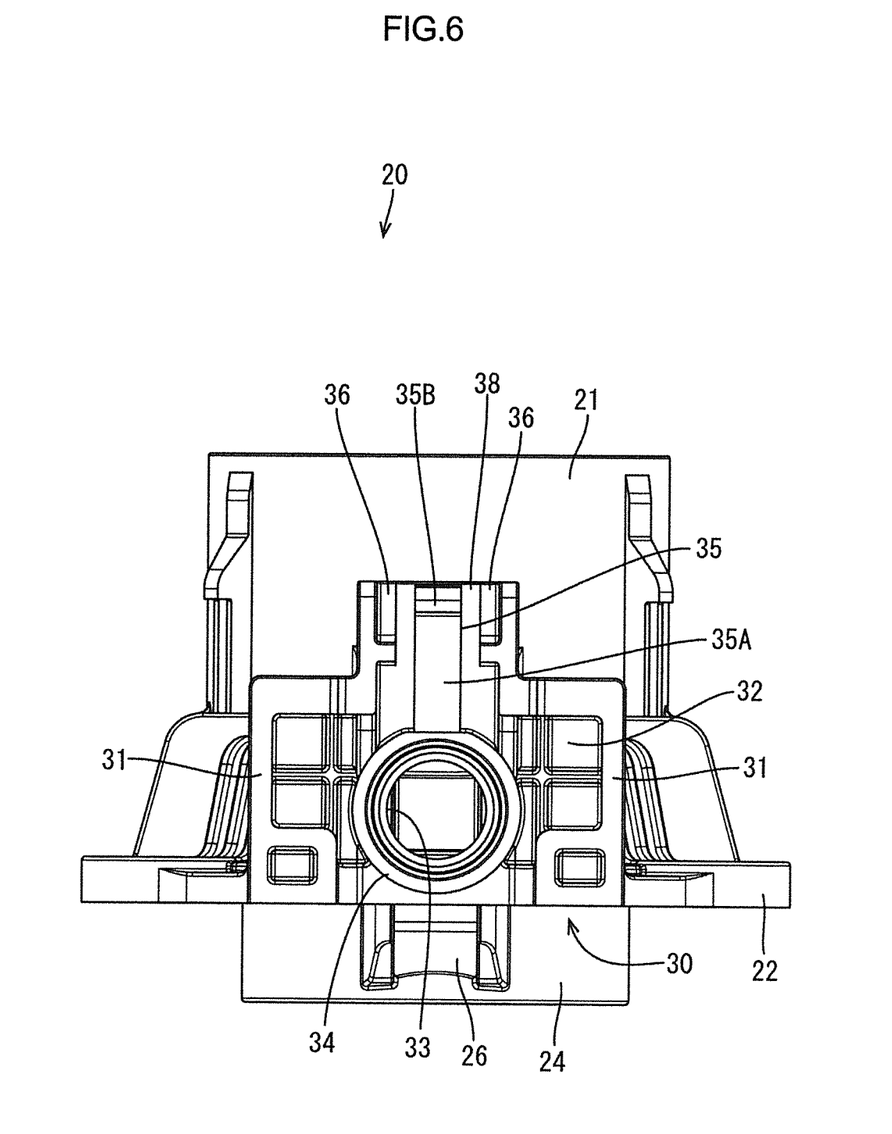
FIG. 6 is a plan view of the housing.

As illustrated in FIG. 5, the connector fitting portion 21 is disposed penetrating through the attachment plate 22 in a front-rear direction. The cable lock mount portion 30 is disposed on a portion of the connector fitting portion 21 which protrudes to the rear of the attachment plate 22. The cable lock mount portion 30 is positioned at the rear of the fitting-locking portion 26 and on the upper end portion of the connector fitting portion 21. The cable lock mount portion 30, as illustrated in FIG. 6, has the shape of a box with an upper opening, and is provided with a pair of opposed right and left locking walls 31, and a bottom wall 32 disposed between the locking walls 31. The bottom wall 32 has an insertion hole 33 penetrating through in an upper-lower direction for insertion of a movable shaft of an actuator built inside the cable lock 50.

The cable lock 50 is a safety device for preventing the charge connector from being separated from the connector fitting portion 21 so as to prevent unauthorized pulling of the charge connector after the start of charging. The movable shaft of the actuator is adapted to be movable up and down between an unlocking permitted position and an unlocking prohibited position while being passed into the insertion hole 33 of the cable lock mount portion 30. In the unlocking prohibited position, the movable shaft of the actuator advances into the connector fitting portion 21, and the distal end portion of the lock lever abuts on a lower-end portion of the movable shaft of the actuator, whereby a lock lever releasing operation is prevented. On the other hand, in the unlocking prohibited position, the movable shaft of the actuator is withdrawn to a height position where the distal end portion of the lock lever is not abutted, and the lock lever releasing operation is permitted.

Figure 4:
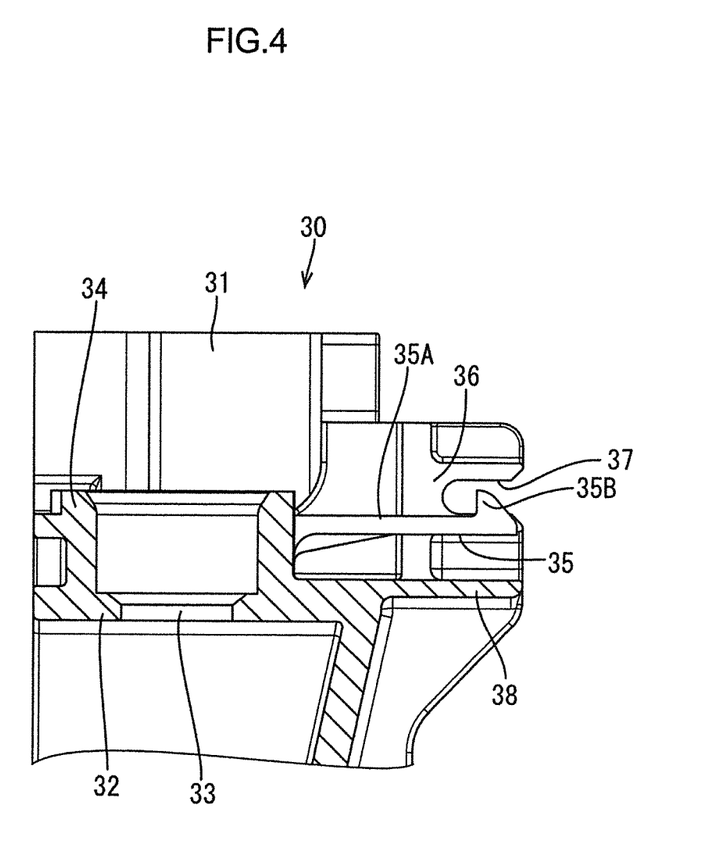
FIG. 4 is a cross sectional view taken along line B-B of FIG. 3.

At a hole edge portion of the insertion hole 33, as illustrated in FIG. 4, a cylindrical portion 34 is disposed protruding upward. Accordingly, the movable shaft of the actuator advances into the connector fitting portion 21 via the inside of the cylindrical portion 34 and the insertion hole 33. On an outer surface of the cylindrical portion 34, a cantilever-shaped pin lock 35 is disposed protruding rearward. The pin lock 35 is provided with an arm portion 35A extending in the front-rear direction and bendable in the upper-lower direction, and a locking portion 35B protruding upward from a distal-end portion of the arm portion 35A. When the arm portion 35A is bent, the locking portion 35B can be pivotally displaced in the upper-lower direction. The upper surface of the arm portion 35A and the front surface of the locking portion 35B (the surface which is opposed to the cylindrical portion 34 and which is locked on a locked portion 42 which will be described below) are substantially orthogonal to each other.

Figure 7:
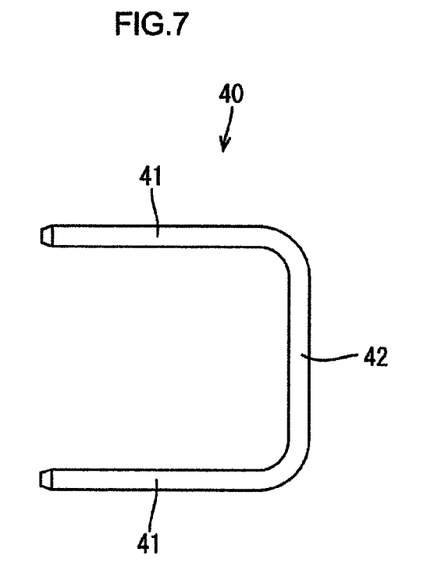
FIG. 7 is a plan view of a cable lock pin.
Figure 8:
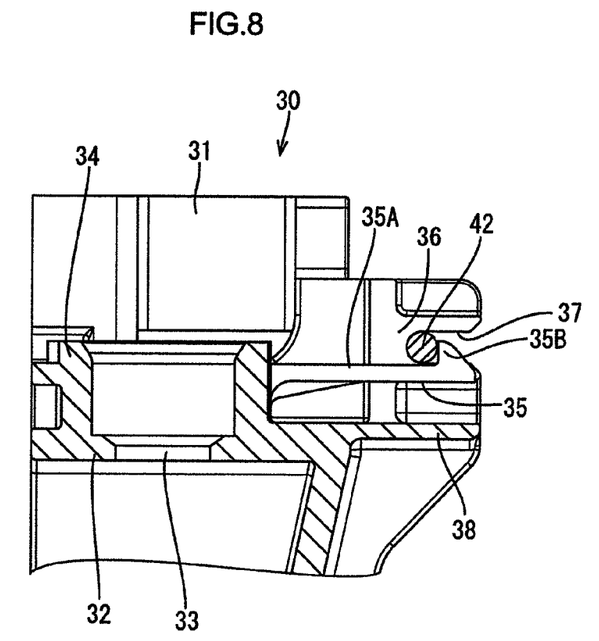
FIG. 8 is a cross sectional view illustrating a state in which the cable lock pin is retained by a pin lock.

As illustrated in FIG. 7, the cable lock pin 40 is a metal pin bent at right angles at two locations into a substantially U-shape as a whole. The cable lock pin 40 is provided with a pair of opposed lock pins 41, and a locked portion 42 linking the lock pins 41. The distal-end portions of the lock pins 41 are tapered.

Figure 2:
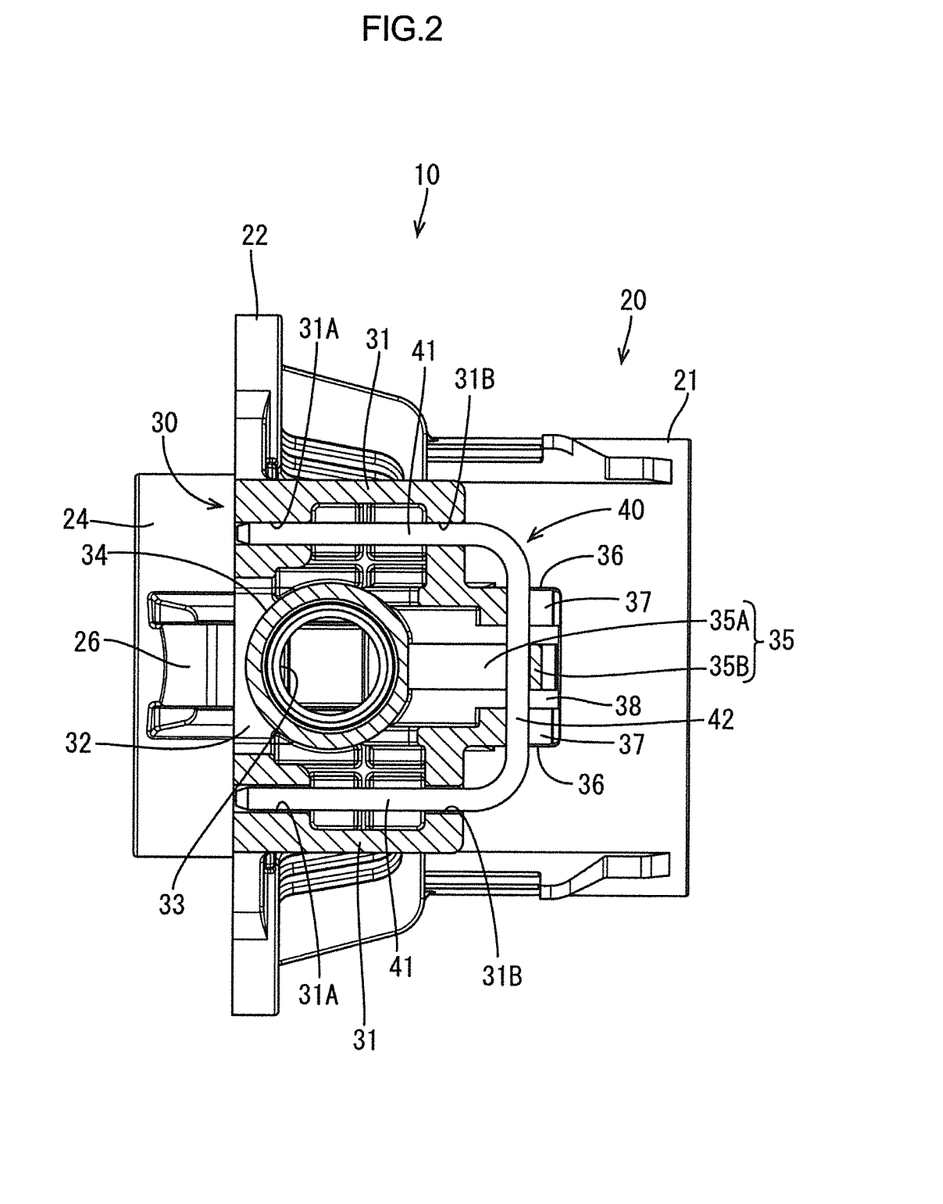
FIG. 2 is a cross sectional view taken along line A-A of FIG. 1.

As illustrated in FIG. 2, the locking walls 31 are recessed, and, both forwardly and rearwardly of the recessed portions, a front-rear pair of locking holes 31A into which the lock pins 41 are inserted are provided. Into the forward locking holes 31A, the distal-end portions of the lock pins 41 are inserted, while into the rearward locking holes 31B, proximal-end portions of the lock pins 41 are inserted penetrating through in the front-rear direction. The locked portion 42 is locked by the locking portion 35B of the pin lock 35 from the rear. In this way, the cable lock pin 40 is held in the cable lock mount portion 30. The lock pins are exposed in the recessed portion of the locking walls 31 (between the forward locking holes 31A and the rearward locking holes 31B), the exposed portions enabling the cable lock 50 from falling off from the cable lock mount portion 30.

On both right and left sides of the pin lock 35, a pair of support walls 36 are provided. The support walls 36 are disposed in opposed state and protruding rearward from the rear surface of the respective locking walls 31. As illustrated in FIG. 5, the support walls 36 are provided with guide holes 37 which are opened rearward. The guide holes 37 are holes for allowing the locked portion 42 of the cable lock pin 40 to advance from the rear. The upper and lower corner portions of the openings of the guide holes 37 are tapered so as to guide the locked portion 42 into the guide holes 37. When the locked portion 42 is housed in the guide holes 37, the locked portion 42 is supported by the inner peripheral surfaces of the guide holes 37.

Figure 9:
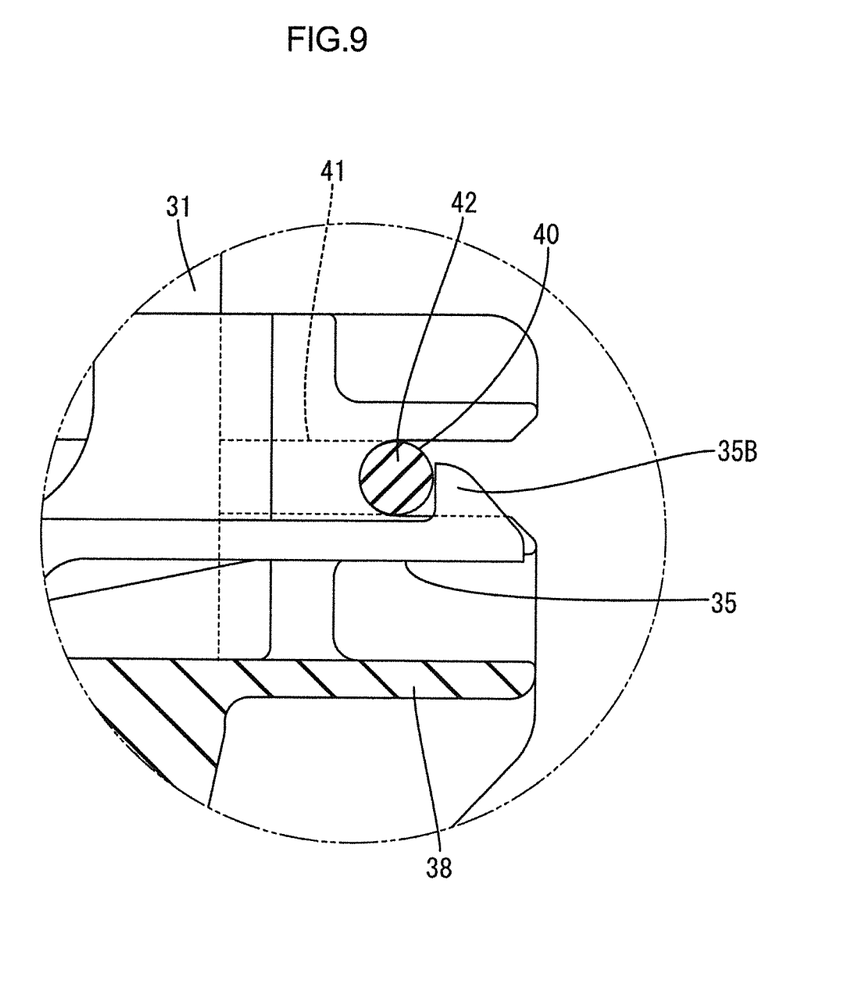
FIG. 9 is an enlarged cross sectional view of major portions of FIG. 8.

When the locked portion 42 is the closest to the arm portion 35A of the pin lock 35, i.e., when the locked portion 42 is supported by the lower surfaces of the inner peripheral surfaces of the holes 37, as illustrated in FIG. 9, the locked portion 42 does not contact the upper surface of the arm portion 35A, so that a gap is ensured between the opposed faces of the upper surface of the arm portion 35A and the lower end of the locked portion 42. Thus, even when the cable lock pin 40 is vibrated in the upper-lower direction by vibrations of the vehicle, the locked portion 42 remains in the position having no contact with the arm portion 35A, and downward displacement of the locked portion 42 is restricted. Accordingly, damage to the pin lock 35 due to a transfer of vibrations of the locked portion 42 to the arm portion 35A can be avoided.

Figure 10:
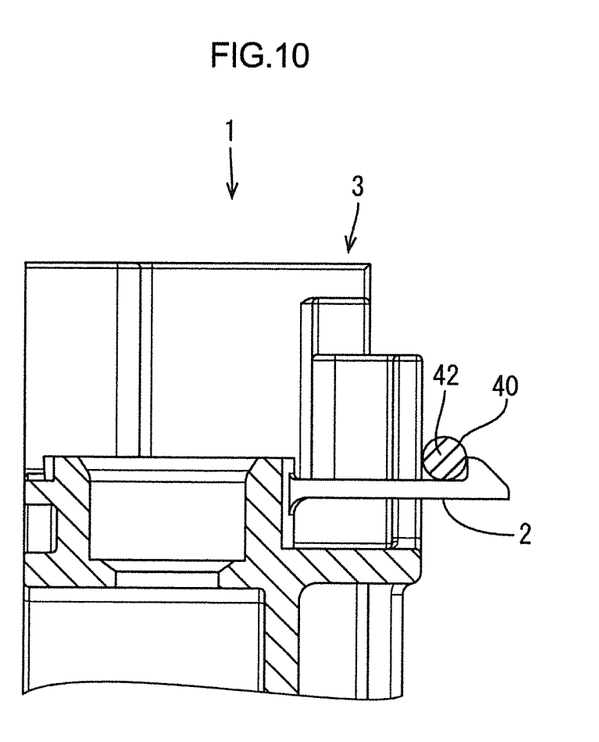
FIG. 10 is a cross sectional view for comparison to describe the effect of a displacement restricting portion.

If the support walls 36 are not provided, the locked portion 42 is directly supported on the upper surface of the arm portion 2 of the charging inlet 1, as illustrated in FIG. 10. Accordingly, when the cable lock pin 40 vibrates in the upper-lower direction, the arm portion 2 also vibrates in the upper-lower direction. As a result, in a worst case, the arm portion 2 may be damaged and the cable lock pin 40 may come off the cable lock mount portion 3. In this respect, in the charging inlet 10 according to the present embodiment, damage to the pin lock 35 is prevented so that the cable lock pin 40 does not come off the cable lock mount portion 30.

The pair of support walls 36 are linked by a link wall 38. The link wall 38 is disposed substantially in parallel under the arm portion 35A. The link wall 38 serves as an excessive-bending prevention wall to prevent damage to the arm portion 35A when subjected to external force and bent and deformed excessively, and as a reinforcing wall to prevent the respective support walls 36 from falling. If the arm portion 35A is bent to such an extent as to contact the link wall 38, the arm portion 35A may undergo plastic deformation and fail to return to the height position in natural state. The height position of the link wall 38 is set such that, even in the above case, the arm portion 35A can return to the height position enabling the locking portion 35B to be locked on the locked portion 42. Accordingly, even if the arm portion 35A undergoes plastic deformation, the cable lock pin 40 does not come off the cable lock mount portion 30.

The operation of the present embodiment configured as described above will be described. First, the lower-end portion of the cable lock 50 is fitted on the cable lock mount portion 30 from above. Then, the cable lock pin 40 is fitted to the cable lock mount portion 30 from the rear. In this case, the respective lock pins 41 advance into the locking holes 31A, 31B of the respective locking walls 31 from the rear. When the locked portion reaches the locking portion 35B, the locking portion 35B is displaced downward by the locked portion 42, and the arm portion 35A is bent and deformed. When the locked portion 42 moves over the locking portion 35B, the arm portion 35A simultaneously elastically returns, whereby the locking portion 35B becomes locked on the locked portion 42 from the rear. In this way, the cable lock pin 40 is held on the cable lock mount portion 30, and the cable lock 50 is held on the cable lock mount portion 30 by the cable lock pin 40.

Then, when the charge connector is fitted onto the connector fitting portion 21, the lock lever of the charge connector is locked on the fitting-locking portion 26, whereby the charge connector is held on the connector fitting portion 21. When charging is started, the movable shaft of the actuator moves from the unlocking permitted position to the unlocking prohibited position, where a lock lever releasing operation is prohibited. Thereafter, when charging is stopped, the movable shaft of the actuator moves from the unlocking prohibited position to the unlocking permitted position, where a lock lever releasing operation is permitted. Thus, the charge connector can be detached from the connector fitting portion 21.

As described above, according to the present embodiment, displacement of the cable lock pin 40 is restricted by the displacement restricting portion (support walls 36), so that the cable lock pin 40 does not contact the pin lock 35. Accordingly, when the vehicle vibrates and the cable lock pin 40 is vibrated, the vibrations of the cable lock pin 40 are not directly transmitted to the pin lock 35. In this way, damage to the pin lock 35 can be prevented, and further the cable lock pin 40 and the cable lock 50 can be prevented from coming off the cable lock mount portion 30.

The cable lock pin 40 may have a substantially U-shape as a whole and include a pair of opposed lock pins 41 and the locked portion 42 linking the lock pins 41. The lock pins 41 may be inserted into the locking holes 31A, 31B, and the locked portion 42 may be locked by the pin lock 35.

In this configuration, by inserting the pair of lock pins 41 respectively into the locking holes 31A, 31B, the posture of the locked portion 42 can be stabilized, making it easier to hold the locked portion 42 in a state of being locked by the locking portion 35B.

The pin lock 35 may include the arm portion 35A extending in cantilever fashion and being bendable, and the locking portion 35B provided at the distal-end portion of the arm portion 35A so as to lock the locked portion 42.

In this case, the shape of the pin lock 35 may be set such that the locked portion 42 does not contact the arm portion 35A but is locked by the locking portion 35B.

The displacement restricting portion may include a pair of support walls 36 that support the locked portion 42, and, in the state in which the locked portion 42 is supported on the support walls 36, a gap may be ensured between the opposed surfaces of the arm portion 35A and the locked portion 42.

In this configuration, the locked portion 42 can be supported by the pair of support walls 36, so that, when vibrations are transmitted to the cable lock pin 40, the locked portion 42 can be prevented from contacting the arm portion 35A.

The displacement restricting portion is further provided with the link wall 38 linking the pair of support walls 36, and the arm portion 35A is configured to be bent to contact the link wall 38 and then return to a height where at least the locking portion 35B can be locked on the locked portion 42.

In this configuration, even when external force is applied to the arm portion 35A, and the arm portion 35A is bent to contact the link wall 38 and undergoes plastic deformation, the cable lock pin 40 can be prevented from coming off because the link portion is provided such that the arm portion 35A can return to the height where the locking portion 35B can be locked on the locked portion 42.

The technology disclosed in the present description is not limited to the embodiment explained in the above description and described with reference to the drawings, and may include the following various modes, for example.

While in the embodiment the cable lock pin 40 having substantially U-shape has been described by way of example, the shape of the cable lock pin is not limited to the U shape and may be L shape, for example.

While in the embodiment the pin lock 35 provided with the cantilever-shaped arm portion 35A has been described by way of example, the pin lock may include a both-end supported arm portion.

While in the embodiment the locked portion 42 is supported by a pair of support walls 36, displacement of the locked portion 42 may be restricted by reducing the size of the locking hole.

While in the embodiment the guide holes 37 are provided to guide the locked portion 42, the guide holes may not be configured as long as there is at least a support surface that supports the locked portion 42.

While in the embodiment the respective support walls 36 are reinforced by the link wall 38, the link wall 38 may not be provided, and the support walls may be configured as part of the locking walls having sufficient strength.

In the embodiment, when the arm portion 35A is bent to contact the link wall 38, the arm portion 35A undergoes plastic deformation by way of example. However, the arm portion may not undergo plastic deformation and yet be prevented from being excessively elastically deformed when the arm portion is bent to contact the link wall.

EXPLANATION OF SYMBOLS

10: Charging inlet
30: Cable lock mount portion
31: Locking wall
31A, 31B: Locking hole
35: Pin lock
35A: Arm portion
35B: Locking portion
36: Support wall (displacement restricting portion)
38: Link wall
40: Cable lock pin
41: Locking pin
42: Locked portion
50: Cable lock

The invention claimed is:

1. A charging inlet comprising:
a connector fitting portion holding a charging connector therein;
a cable lock mount portion protruding from the connector fitting portion for mounting a cable lock; and
a cable lock pin configured to fix the cable locked to the cable lock mounting portion, wherein
the cable lock mount portion includes:
  a bottom wall including an insertion hole in which a portion of the cable lock is to be inserted in a first direction, the insertion hole having an opening in a surface of the bottom wall on an opposite side from the connector fitting portion;
  a locking wall including at least one locking hole in which the cable lock pin is to be inserted, the locking hole extending in a second direction perpendicular to the first direction in which the portion of the cable lock is inserted in the insertion hole of the bottom wall;
  a pin lock to be locked on the cable lock pin for retaining the cable lock pin; and
  a displacement restricting portion for restricting displacement of the cable lock pin toward the pin lock by abutting on the cable lock pin at a position at which the cable lock pin does not contact the pin lock when the cable lock pin is displaced in the first direction toward the pin lock.

2. The charging inlet according to claim 1, wherein:
the cable lock pin has a substantially U-shape, and includes a first linear section, a second linear section and a linking section connecting the first linear section to the second linear section,
the at least one locking hole includes a first locking hole and a second locking hole,
the first linear section is inserted in the first locking hole,
the second linear section is inserted in the second locking hole, and
the displacement restricting portion abuts on the linking section when the cable lock pin is displaced in the first direction.

3. The charging inlet according to claim 2, wherein the pin lock includes an arm portion having a cantilever structure and a locking portion at a distal-end portion of the arm portion,
the arm portion extends parallel to the first locking hole and the second locking hole, and
the locking portion protrudes from the arm portion in the first direction to be opposed to the linking section of the cable lock pin.

4. The charging inlet according to claim 3, wherein the displacement restricting portion includes a pair of support walls for supporting the locked portion with a gap ensured between opposed surfaces of the arm portion and the locked portion in a state in which the locked portion is supported on the support walls.

5. The charging inlet according to claim 4, wherein:
the displacement restricting portion further includes a link wall linking the pair of support walls; and
the arm portion bends to contact the link wall and then returns to a height where at least the locking portion can be locked on the locked portion.

6. A charging inlet comprising a cable lock mount portion for mounting a cable lock,
wherein the cable lock mount portion includes:
  a locking wall including a locking hole in which a cable lock pin is to be inserted;
  a pin lock to be locked on the cable lock pin for retaining the cable lock pin; and
  a displacement restricting portion for restricting displacement of the cable lock pin toward the pin lock by abutting on the cable lock pin at a position at which the cable lock pin does not contact the pin lock when the cable lock pin is displaced in a direction toward the pin lock, wherein the displacement restricting portion includes a pair of support walls for supporting the locked portion with a gap ensured between opposed surfaces of the arm portion and the locked portion in a state in which the locked portion is supported on the support walls.

7. The charging inlet according to claim 6, wherein:
the displacement restricting portion further includes a link wall linking the pair of support walls; and
the arm portion bends to contact the link wall and then returns to a height where at least the locking portion can be locked on the locked portion.

* * * * *